Nov. 26, 1957 W. J. GOLOBAY 2,814,466
WIRE FENCE WITH PIVOTED ACTUATOR
Filed Dec. 7, 1955
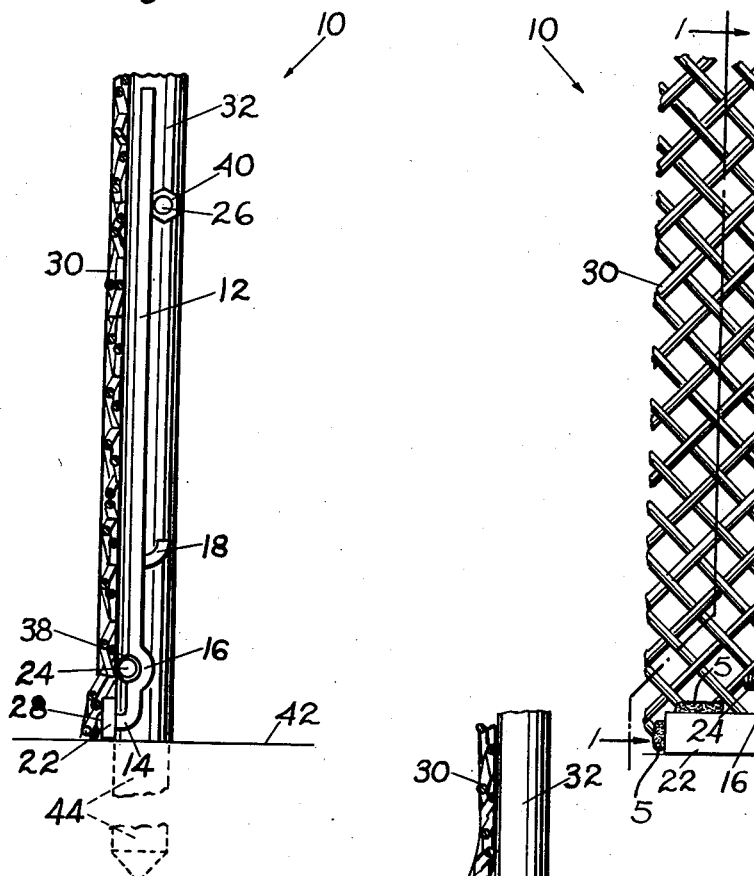
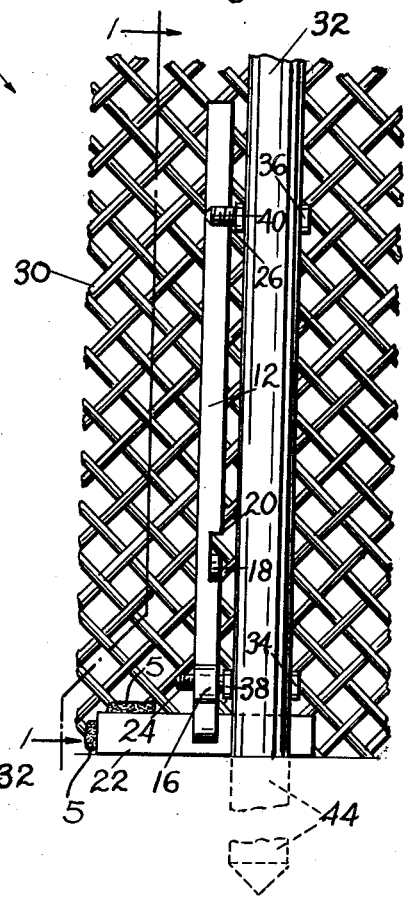
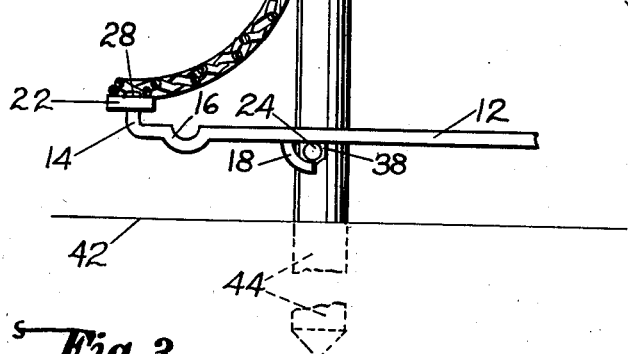
INVENTOR.
W. J. Golobay
BY Arthur H. Sturges
Attorney

United States Patent Office 2,814,466
Patented Nov. 26, 1957

2,814,466
WIRE FENCE WITH PIVOTED ACTUATOR
William J. Golobay, Meade, Kans.

Application December 7, 1955, Serial No. 551,590

5 Claims. (Cl. 256—32)

This invention relates to fences particularly of the type having wire mesh or the like secured to fence posts and positioned with the lower edge of the wire extended substantially to the ground, and in particular a device mounted on each fence post for suspending the lower portion of the wire in an outwardly extended position to facilitate cleaning the fence row and to permit cutting grass, weeds and the like along the fence.

The purpose of this invention is to provide means for moving the wire of a fence to one side to facilitate cutting grass, weeds and the like and removing trash from the fence row.

In the conventional type of wire mesh fence the wire extends to the ground and with the wire secured to the fence posts at several points from the top to the bottom the lower edge is substantially rigid and it is difficult to cut grass and remove trash close to the fence. Consequently, in some farming communities, and particularly where help is scarce, bushes, weeds, and the like will be found along the fence rows.

With this thought in mind this invention contemplates an attachment adapted to be positioned on a fence post with which the lower edge of the wire of a fence is retained in position and whereby the lower portion of the wire is adapted to be projected outwardly and retained in an extended position while grass is cut or trash removed from the fence row.

The object of this invention is, therefore, to provide means for mounting wire mesh fencing on fence posts whereby the lower portion of the wire is adapted to be extended outwardly to facilitate cleaning the fence row.

With these and other objects and advantages in view the invention embodies a bar having an arcuate socket spaced from an L-shaped lower end with an arcuate finger spaced upwardly from the socket and with a horizontally disposed base plate carried by the lower end and adapted to be secured to the lower edge of the wire of a fence, whereby with the socket positioned on a lower stud extended from the side of a fence post and the upper end of the bar forced over an upper stud also on the fence post the base plate urges the wire against the post, and with the arcuate finger positioned over the lower stud the lower edge of the wire of the fence is adapted to be extended outwardly by drawing the upper end of the bar, which provides a handle, downwardly.

Other features and advantages of the invention will appear from the following description taken in connection with the drawings, wherein:

Figure 1 is a cross section through a fence taken on line 1—1 of Figure 2 showing the attachment of this invention installed on the side of a fence post and showing the device in the inoperative or nested position.

Figure 2 is a rear elevational view of a fence also showing the attachment nested against one side of a fence post.

Figure 3 is a view similar to that shown in Figure 1, but showing the lower part of the fence in an adjusted position.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings and in the following specification, the same reference characters are used to designate the same parts and elements throughout, and in which the numeral 10 refers to the invention in its entirety, numeral 12 indicating a bar having an L-shaped lower end with an extended horizontally disposed section 14, an arcuate socket 16 spaced from the lower end and an arcuate finger 18 struck from a recess 20 in the side of the bar and spaced upwardly from the socket, a base plate 22 secured to the extended section 14, a lower stud 24 positioned to receive the socket 16 with the bar in the folded or nested position, and an upper stud 26 positioned to hold the upper end of the bar.

The base plate 22 is provided with an opening through which the end of the section 14 extends and the extended end of the section 14 is peened over as shown at the point 28, in Figure 1. The base plate may, however, be secured to the lower end of the bar or handle by other suitable means. The base plate is secured to the lower edge of the wire 30 by welding, as shown at the point 5, or other suitable means, and the upper portion of the wire of the fence is secured to the fence posts 32 by conventional means.

The studs 24 and 26 extend from ends of bolts 34 and 36 which extend through the posts 32, and the bolts are secured in the posts by lock nuts 38 and 40.

The lower ends of the posts, which extend into the ground 42, are indicated by the broken lines 44.

With the device provided as illustrated and described the finger 18 is removed from the lower stud 24 and the socket 16 placed over the lower stud, whereby, using the bar as a lever the lower edge of the wire is drawn downwardly against the post, as shown in Figure 1, and the upper part of the bar moved over and secured behind the upper stud 26. By this means the bar is locked in the nested position on the side of the post, and the lower edge of the wire is secured in position against the lower portion of the post.

In positioning the fence wire for cleaning the fence row the upper end of the bar or handle is removed from the upper stud 26 and moved downwardly, sliding the bar under the stud and forcing the wire outwardly, as shown in Figure 3. With the wire extended the finger 18 is positioned over the lower stud and the wire is retained in the extended position whereby grass, weeds, and the like may be cut along the fence row, and trash and the like may be removed therefrom.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. An attachment for a fence comprising a bar having a semi-circular socket spaced inwardly from one end and extended inwardly from one side, an arcuate finger spaced inwardly from the socket and extended from the side of the bar opposite to that in which the socket is positioned, and a base plate carried by the lower end of the bar, said base plate being mounted on the end of and extended transversely from a horizontally disposed end section of the bar.

2. An attachment comprising a fence post, wire mesh mounted on the post, vertically spaced horizontally positioned studs extended from one side of the fence post, and a bar having a base plate on the lower end, a socket spaced upwardly from the lower end, and a finger spaced upwardly from the socket, said base plate being permanently secured to the lower edge of the wire mesh.

3. A fence actuator comprising a lever having a transversely positioned plate on one end, a socket spaced from the plate, and a finger spaced from the socket, a fence post, studs mounted in and extended from one side of the post, wire mesh fastened to the fence post, the lower edge of the wire mesh being welded to the transversely positioned plate, said device being adapted to be positioned, selectively, with the socket on one of said studs on said post, with the upper end of the lever against another of said studs on the upper part of said post, and with the plate and wire secured thereto positioned against the lower part of the post, or with the finger positioned on said first mentioned stud and the plate extended with the lower edge of the wire in an elevated position.

4. In combination, a fence post, woven wire fencing secured to one side of the post, upper and lower studs extended from one side of the post, and a bar having a transversely disposed plate on one end with a socket spaced from the end and adapted to be positioned over the lower stud with the upper end of the bar against the upper stud, and with a finger spaced from the socket and also adapted to be positioned over the lower stud for holding the wire in an outwardly and upwardly disposed position to facilitate cleaning the fence row.

5. In a fence raising device, the combination which comprises a fence post, fencing wire positioned on one side of the post and secured to the post, upper and lower studs extended from a side of the post and positioned in a plane parallel to a plane in which the wire is positioned, and a bar having a base plate on one end, an arcuate socket in one side and spaced from the base plate, and an arcuate finger extended from the side opposite to the side in which the socket is positioned, said base plate being secured to the lower edge of the fencing wire and adapted to be positioned against the lower end of the post with the socket over the lower stud and the upper end of the bar against the upper stud, or in an elevated and extended position with the finger over the lower stud and with the bar in a substantially horizontal position, whereby the lower edge of the fencing wire is spaced above the ground and extended from one side of the fence.

References Cited in the file of this patent
UNITED STATES PATENTS

| | | |
|---|---|---|
| 314,654 | Cox | Mar. 31, 1885 |
| 546,913 | Botkin | Sept. 24, 1895 |
| 657,145 | Wiggins | Sept. 4, 1900 |
| 716,082 | McKinly | Dec. 16, 1902 |
| 1,598,514 | Benner | Aug. 31, 1926 |
| 2,189,713 | Hansen | Feb. 6, 1940 |